US008874497B2

(12) United States Patent
Raestik et al.

(10) Patent No.: US 8,874,497 B2
(45) Date of Patent: Oct. 28, 2014

(54) METHOD AND SYSTEM FOR CONTROLLING ENVIRONMENTAL CONDITIONS OF DIFFERENT ENTITIES

(75) Inventors: Raivo Raestik, Tallinn (EE); Priit Vimberg, Tallinn (EE)

(73) Assignee: Zerogroup Holding OU, Tartu (EE)

( * ) Notice: Subject to any disclaimer, the term of this patent is extended or adjusted under 35 U.S.C. 154(b) by 250 days.

(21) Appl. No.: 13/511,009

(22) PCT Filed: Nov. 22, 2010

(86) PCT No.: PCT/EP2010/067918
§ 371 (c)(1),
(2), (4) Date: May 21, 2012

(87) PCT Pub. No.: WO2011/061322
PCT Pub. Date: May 26, 2011

(65) Prior Publication Data
US 2012/0239603 A1 Sep. 20, 2012

(30) Foreign Application Priority Data
Nov. 20, 2009 (EP) .................................. 09176685

(51) Int. Cl.
*G06F 15/18* (2006.01)
*G06E 1/00* (2006.01)
*G06E 3/00* (2006.01)
*G06G 7/00* (2006.01)
*G05B 19/042* (2006.01)

(52) U.S. Cl.
CPC ...... *G05B 19/042* (2013.01); *G05B 2219/2642* (2013.01)
USPC .......................................................... 706/21

(58) Field of Classification Search
CPC combination set(s) only.
See application file for complete search history.

(56) References Cited

U.S. PATENT DOCUMENTS

| | | |
|---|---|---|
| 6,400,956 B1 * | 6/2002 | Richton ............... 455/456.3 |
| 6,577,962 B1 | 6/2003 | Afshari |
| 6,904,385 B1 | 6/2005 | Budike, Jr. |
| 6,965,319 B1 | 11/2005 | Crichlow |
| 7,451,017 B2 | 11/2008 | McNally |

FOREIGN PATENT DOCUMENTS

EP 1770454 4/2007

OTHER PUBLICATIONS

Mozer M C et al "The Neurothermostat:Predictive Optimal Control of Residential Heating Systems" Advances in Neural Information Proceeding of the 1996 Conference Dec. 2-5, 1996 1997, MIT Press, London UK, pp. 953-959.
Manu Gupta, Stephen S. Intille, and Kent Larson :"Adding GPS-Control to Traditional Thermostats: An Exploration of Potential Energy Savings and Design Challenges" May 11, 2009, Pervasive Computing, Springer Berlon Heideberg, Berlin, Heidelberg, pp. 95-114.
Jim Nanini :"An Enterprise Approach" securitysolutions.com, Apr. 1, 2008 URL:http://securitysolutions.com/enduser/schoolsuniversities/enterprose_approach_hvac/.
Bill Savage :"Building System Integration Faces Challenges" Security Control Systems, Inc, Apr. 28, 2005 URL:http://74.125.155.132/scholar.google.com/&hl=en&as_sdt=2000.

* cited by examiner

*Primary Examiner* — Michael B Holmes
(74) *Attorney, Agent, or Firm* — Mark M. Friedman

(57) ABSTRACT

The invention relates to a controlling system for adjusting environmental conditions of at least one entity, wherein the entity has desired environmental conditions for at least two different states. The system comprises equipments controlled by controlling means for changing and/or maintaining the environmental condition of the entities. The controlling means is adapted to provide controlling parameters to equipments for adjusting the environmental condition of said entity so that at least one parameter used for controlling the environmental condition of said entity depends on at least one measured environmental condition parameter of another entity being different from the entity, which environmental condition is adjusted by said equipment.

15 Claims, 2 Drawing Sheets

METHOD AND SYSTEM FOR CONTROLLING ENVIRONMENTAL CONDITIONS OF DIFFERENT ENTITIES

TECHNICAL FIELD OF THE INVENTION

The present invention relates to a method and system for controlling and adjusting environmental conditions of different entities, such as rooms. The environmental conditions may relate e.g. temperature, humidity, $CO_2$ level, electricity, access rules, water supply, and lighting, for example.

BACKGROUND OF THE INVENTION

An average household annually uses approximately 13 MWh of energy only for heating the premises. In addition, all those households generate approximately ⅕ of global $CO_2$ emissions. Operating costs (including energy costs) for the building can make up 80% of the total cost of ownership during a building's lifecycle. Thus it is especially important to invest in energy efficiency, with today's rising energy prices, to save on future operating costs.

Solutions for energy saving and controlling are known from prior art, such as a multi-utility energy control system described in U.S. Pat. No. 6,904,385, where a control center computer is connected to various utility consuming systems and is adapted to provide interactive opportunities for the consumer via a plurality of diverse energy and utility-related search engines. In addition the system is adapted to sense real time rates from existing utility meters, and receive and update alternative utility company competitive pricing information as well as provide short term utility contracts for purchase of competitively priced utilities of an alternative utility company.

Among others U.S. Pat. No. 6,965,319 discloses a system having a central station being in a data communication with utility meters via internet for acquiring meter data. The central station includes a load forecasting agent to predict an amount of power used at remote locations based upon data acquired by the intelligent agent so that an optimization of operation of the meters can be done.

In addition, for example document U.S. Pat. No. 7,451,017 discloses a system for predicting energy use conditions to be encountered by a building. It provides Multi-Variant, Non-Linear load forecasting techniques, energy and cost savings calculations, and Weather Ranking, where the load forecasting technique accepts numerous external parameters as input. The system calculates energy and cost savings using Complex Rates and time-of-use energy data.

Furthermore document U.S. Pat. No. 6,577,962 discloses a system which generates an energy usage load forecast profiles base on a determined periodic energy load usage of the facility Also different kinds of intelligent building systems are known from prior art, such as the building systems including security systems, fire control systems, elevator systems, and/or building environmental system described by U.S. Pat. No. 7,451,017. The building environmental system may regulate e.g. temperature and air flow in a building. Air conditioning may include chillers for cooling air, heaters for heating air and fans for distributing air into a duct system that directs the flow of air to the various rooms of a building. It is also known that the speed of a motor that drives a fan may be controlled to regulate air flow within the system. In U.S. Pat. No. 7,451,017 the control system is used to vary the fan motor speed in order to maintain the desired conditions within the building.

However, there are some disadvantages relating to the known prior art solutions, such as that they are able to minimize the energy consumption and costs only for a certain facility or building but not comprehensively and for larger or more complex entities.

SUMMARY OF THE INVENTION

An object of the invention is to alleviate the problems and disadvantages relating to the known prior art solution. Especially the object is to increase the users' security, comfort and quality of life, and saving energy at the same time at larger or more complex entities.

At least a part of the objects of the invention is achieved by the present inventive solution for controlling environmental conditions of at least two different entities, which is characterised for example by the features of independent claims, such as claims 1, 8, 10, and 19.

The invention relates to a controlling system for controlling environmental conditions of at least two different entities according to claim 1. In addition the invention relates to a controller means for controlling environmental conditions of at least two different entities according to claim 8, as well as to method 1 for controlling environmental conditions of at least two different entities according to claim 11 and to computer program product 19.

According to an embodiment of the invention environmental conditions of at least two different entities, such as first and second entities, can be adjusted, such as changed or maintained. The entities have advantageously desired environmental conditions for at least two different states. In the entities appropriate equipments are used for adjusting the environmental condition, such as cooler or heater, but not limiting only to those. The first equipments are related to the first entity, and the second equipments are related to the second entity, and so on. The adjusting is implemented by using controlling parameters provided by controlling means. The controlling means or controller may be for example a centralized server or individual controlling means being in data communications with the server or other controlling means. The first controlling means are used for controlling the function of the first equipments in the first entity, the second controlling means are used for controlling the function of the second equipments in the second entity, and so on. The controlling signals between the controlling means and equipments may be delivered via appropriate modules, which may additionally adjust the controlling signals for the equipments, such as perform analogy-digital conversions.

According to the invention the environmental condition in the first entity is measured by first measuring means, which also signals measured data to the first controlling means, and the environmental condition in the second entity is measured by second measuring means, which in turn signals measured data to the second controlling means, and so on. The measuring means may be an individual sensor, such as a thermometer, but according to the invention the measuring means may also be integrated into the module, or into the equipment or even user interface means through which the user may provide controlling inputs, such as desired temperatures.

Especially according to an embodiment of the invention the controlling means is adapted to provide controlling parameters to the equipments for adjusting the environmental condition of said entity (such as the first entity) so that at least one parameter used for controlling the environmental condition of said entity depends on at least one measured environmental condition parameter of another entity (such as the second entity) being different from the entity, which environmental condition is adjusted by said equipment.

According to an embodiment the environmental condition information may relate for example to indoor temperatures, indoor humidity, indoor $CO_2$-level, indoor/outdoor lighting and access rules used for access controlling to an entity, for example. The environmental conditions controlling means is adapted to control for example heating means, cooling means, ventilation means, lighting means and/or means for affecting humidity. However, it should be clear to a skilled person, that these are only examples and that the invention is not limited only to those examples, but also other environmental conditions may be adjusted by appropriated equipments known by the skilled person. The "means for affecting humidity" may be equipment, the primary purpose of which is to increase or reduce humidity. It may also be equipment, the primary purpose of which is something else, such as heating or cooling, but which also have an effect on the air humidity.

According to an embodiment the first and second controlling means are provided with identified presence information of the user in at least one entity and/or predicted location information of the user indicating when the user will left or arrive in the first and/or second entity, whereupon the controlling means may signal the appropriate equipment of its entity to go into the occupied or non-occupied state (possibly even with a suitable delay) based on said presence information and/or predicted location information. In addition also other possible information gathered from the environments may trigger the system, such as the server or controlling means, providing controlling signals to the equipments in the entities to go into a certain state, such as to close ventilation and electricity in a fire situation.

The general or identified presence information may be composed for example by measuring means, such as for example modules having some presence indicator, such as an IR and/or $CO_2$ detector or motion detector, camera, or other detector or sensor applicable for detecting presence known by the skilled person. It is also possible to use access control equipments for providing the presence information of people. Such access information equipments may be part of the system. The presence information used for the system controls may thus be identified presence information, including the identity information of the person/people who is/are present in the room/entity or other determined premises. Thus it is possible to use the identity information for the environmental controls and predict locations of a certain person/user.

According to an embodiment of the invention the predicted location information of the user may be generated using a neural network, self-learning algorithms and/or traffic information gathered from the environment between the entities the user typically moves. Also time, day and calendar event detection may be used, whereupon the server or controlling means may output "sleep/wake-up" signals also based on time/calendar events. Thus the system of the invention may be aware for example about when the user has left the first entity and about the prediction that the user is arriving at the second entity, whereupon the system, such as the server or controlling means may output signals to the appropriate equipments in the entities to go to either non-occupied or occupied state according to the prediction.

According to an embodiment of the invention a self-learning neural algorithm is used for providing the controlling means or server in addition the predicted location information of the user also with at least one of the following environment related inputs:

a) heating inertia information about the entities determined by said neural algorithm (Inertia of a building when cooling, as well as when heating is considered so that an installer doesn't have to consider the building's construction parameters. The neural algorithm may learn the heating inertia feature of the building for example via the heating and/or cooling behaviour of the building, when the building is heated/cooled numbers of time in different situations.),
b) current outdoor weather conditions (if applicable, indicators such as whether it is a sunny or cloudy day is also considered according to an embodiments, such as also the direction and angle the sun is shining),
c) weather forecast information, and/or
d) tariff (time related, and possibly also price forecast) of energy costs for changing the environmental conditions (e.g. heating/cooling) of the building (so that the building is advantageously e.g. heated during cheaper period of energy costs)
e) possibly also environmental condition information and predicted location information of the user of the other possible (e.g. nearest) entities, like rooms, in the same building.

According to an embodiment of the invention the self-learning neural algorithm takes also into account at least one of the following:

a) current and desired indoor temperatures (of the entity in question and/or also of the other nearest) and possibly at least one of the environment related inputs a)-d) above when it is adapted to determine the control parameter signal to said heating, cooling and/or ventilation means (whereupon the climate conditions controlling means can be adjusted to function "foreseeable way"),
b) current and desired indoor humidity and possibly at least one of the environment related inputs a)-d) (possibly only b)-d) in a situation where e.g. temperature info is not essential) above when it is adapted to determine the control parameter signal to said means for affecting humidity and/or ventilation means,
c) current and desired indoor $CO_2$-level and possibly at least one of the environment related inputs a)-d) (possibly only d)) above when it is adapted to determine the control parameter signal to said ventilation means, and/or
d) current and desired indoor/outdoor lighting and possibly at least one of the environment related inputs a)-d) (possibly only d)) above when it is adapted to determine the control parameter signal to said lighting means.

According to an embodiment of the invention the control parameters are provided to the equipment with a certain delay and in a certain time window. Thereby the system of the invention may take into account the delay for example when the user is arriving at the second place after leaving the first one, as well as also possible rush hours, weather conditions and a vehicle used by the user. Also navigation information may be used, such as provided by the navigation systems of the user's vehicle system for example or a mobile phone based on the cellular navigation.

According to an advantageous embodiment of the invention the controlling parameters provided by said controlling means (or server, when it is used) are based also on the measured environmental condition and said desired environmental condition for said entity, which environmental condition is to be adjusted, in order to achieve or maintain said desired environmental condition for the desired state of said entity.

It is highly advantageous according to an embodiment of the invention that at least one parameter used for controlling the environmental condition of the first entity depends on at least one measured environmental condition parameter of the second entity being different that said first entity.

The present invention offers numerous advantages, such as the combination of access and a security system with climate and lighting control in one complete intelligent system, which provides a complete overview of events happening in an entity or entities, and optimizes the work and maintenance of devices, giving them a longer useful life. It also considerably increases the inhabitants' security and comfort, saving a lot of energy at the same time for numbers of entities without coming at the expense of comfort but on the contrary the users will experience even higher quality of life.

As an example the present invention may be implemented by one easy-to-use complete system which controls e.g. access and security, lighting, climate even at numbers of entities at the same time, where at least one parameter used for controlling the environmental condition of the first entity depends on at least one measured environmental condition parameter of the second entity being different that said first entity. It should be noted that the environmental condition may also include security conditions, in addition to magnitudes relating to environmental comfort. The invention also provides a clear overview of the costs and events occurring in the entities.

In addition the system may be adapted to regulate e.g. the room temperature on the basis of the outdoor temperature or on the basis of a weather forecast, if desired. In addition at least one parameter related to the environmental conditions in another entity, such as workplace, can be taken into account when adjusting the environmental conditions in other entity, such as home. For example, if the user leaves work about at 5 pm, this can be taken into account when regulating e.g. temperature at home so, that the home temperature is again adjusted to the comfort level from the economy mode. Taking all this into consideration, the present invention provides each entity with a stable climate of good quality with minimum energy consumption.

Furthermore, when the user leaves the entity, such as home, the user interface means may inform him if something is wrong in the home. For example, it will inform if a window has been left open, or a lamp is not turned off. The system may e.g. ask if warnings should be ignored or not. If the user leaves home, the system may offer to put the home into the economy mode. In addition, the present invention can also be adapted to create different solutions for special purposes, such as measuring working hours for people and machines, turning machines and devices on and off, or securely unlocking doors even through a web browser, executing routine tasks according to the user's wishes, sending out electric and water system readings, informing the administrative company of the need for maintenance of air conditioners, the heating system or water filters.

The entities where the invention can be used may be e.g. private houses, office buildings, factories, warehouses, schools, hospitals, museums etc. For example in companies the invention can be applied for alarm systems, access control and registration, reducing power and heating costs of rooms, determining the location of employees, individual use of cars and equipment, protection of the office computer systems against improper use, monitoring and measuring the use of production equipment in factories.

The exemplary embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
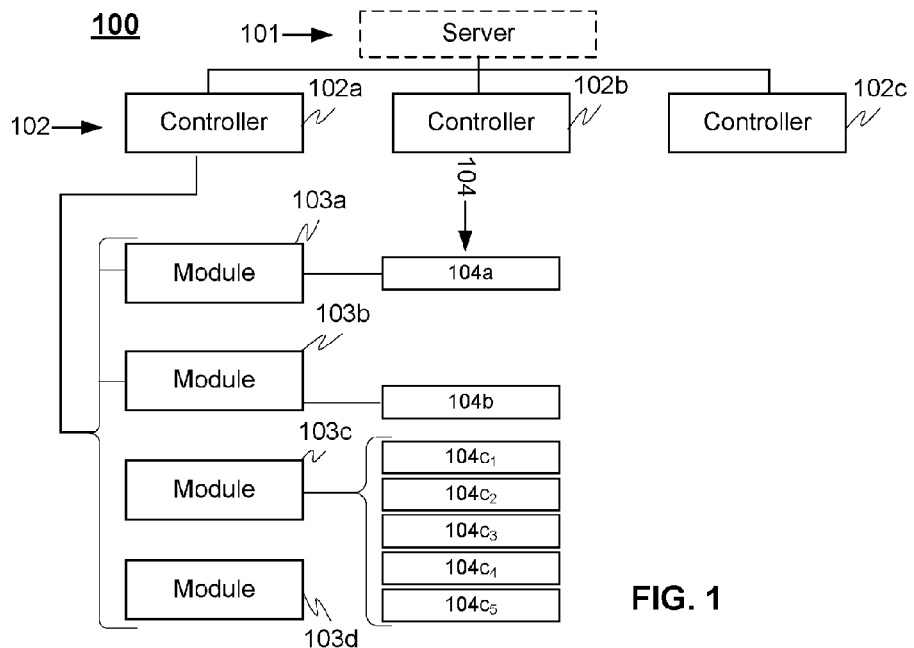
FIG. 1 illustrates an exemplary hierarchy of the system according to an embodiment of the invention.

FIG. 1 illustrates an exemplary hierarchy of the system 100 according to an embodiment of the invention. The system advantageously comprises two layers, namely a controller layer having controlling means or shortly controllers 102 and a module layer having modules 103. In addition the system may also have a server layer 101 having e.g. a main server, but it should be noted that the main server or server layer is not essential in every embodiment according to the invention, but the controlling means may be in data communications directly with each other without the need of server between.

According to an embodiment one controller 102a is advantageously related to one entity, such as an apartment, home, business office, factory or logistics warehouse. The controller 102 is a central hub communicating from one side with different kinds of modules e.g. through RS485 lines and from the other side with other controllers 102a, 102b, 102c located e.g. in different entities. If the server is used (like in more complex systems comprising e.g. hundreds of entities in a large area, such as a neighbourhood or suburb the controllers 102 are in a data connection also with the server 101 e.g. through a data communication system, such as the Internet.

When the server 101 is used the controller 102 may initiate a connection with the server after powering it up. A unique ID and security certificate may be checked by the server during the connection set-up, and the controller may also check the server's security certificate. If the unique ID and all certificates match, a secure communication channel is established. The communication between the controller 102 and server 101 is advantageously encrypted and therefore the public Internet can be used for data transmission. Each controller has a unique ID and advantageously also a security certificate.

As discussed earlier the controller 102a may be in data connection with the modules, such as for example with an access control module 103a, security module 103b, I/O module 103c or infrared module 103d. In addition the modules are in a data connection with different kinds of equipments 104 and/or sensors, such as the access control module 103a may be in data connection with the access managing equipment 104a, like a door sensor (sensing whether the door is open or closed so the equipment may also be in a simplest mode a sensor sensing some environmental condition), electric lock of the door (opening and closing the lock), a buzzer, open button, and key or ID reader. The security module 103b may be in data connection with a security sensor equipment 104b having e.g. input, such as a PIN code reader, and output adapted to switch an alarm ON and OFF, or to switch the local siren. The I/O module 103c may be adapted to send operating signals e.g. to a heating means $104c_1$, cooling means $104c_2$, ventilation means $104c_3$, lighting means $104c_4$, means for affecting humidity $104c_5$, and sprinkler system, but also gathering or receiving measuring signals from the equipments and/or sensors 104, said measuring signals indicating e.g. information relating to the environmental conditions of the entity, such as temperature, humidity and $CO_2$ level.

The controller has advantageously access to information related to the desired and/or measured environmental conditions, such as climate and lighting, access rules, security and remote metering. Said information related to the environmental conditions may be e.g. temperatures, humidity values, $CO_2$-levels, lighting conditions and security details when the entity to which the controller relates is either occupied or non-occupied and/or in some other state, such as for example in a fire situation or under a chancing weather condition. Temperature may be set e.g. lower for the non-occupied entity than for occupied entity, as well as a sprinkler system may be activated in a fire situation and message sent to the fire station.

According to an embodiment information related especially to desired environmental conditions is advantageously locally stored in the controller, which allows for autonomic work also in case of Internet connection loss. All data may be stored locally. According to an embodiment it can also be sent to the server after the Internet connection is restored and if the server is used.

Furthermore the modules are adapted to gather measuring information advantageously from the equipments, such as from heating means $104c_1$, cooling means $104c_2$, ventilation means $104c_3$, lighting means $104c_4$, means for affecting humidity $104c_5$ and sprinkler system. The measuring information may indicate for example current operating status of the equipment, but also temperature, relative humidity, $CO_2$ level, brightness conditions, possible fire and presence information about the presence of people (in generally and/or identified presence) in the entity. Modules are advantageously adapted to send said information to the corresponding controller or the controller is adapted to read said information from the modules.

The controller 102a is adapted to determine measuring information gathered from the equipments 104 and/or other means sensing the environmental conditions and based on the measuring information as well as information related to desired environmental conditions and/or rules input by the user determined and sent a control signal to at least one module being in a data connection with the corresponding equipment used for controlling the environmental condition of said entity.

According to an embodiment of the invention also the server 101 may be incorporated into the hierarchy of the system 100, whereupon some of the tasks dedicated to the controller (in the embodiment without the server) may also be managed by the server, such as analysing measuring information and determining control signal to be fed into the modules. The server is also typically used to control decisions beyond the reach of the controller due to the complexity of the rules or because of rules relating to signals from modules connected to different controllers.

Also, different signals and messages to and from outside the system 100 are advantageously handled by the server, such as for example information related to weather forecast, traffic jams, and tariff and/or prediction of the energy and water costs, as well as also other information related to environmental conditions outside the entities. For example if the server is provided with weather forecast information forecasting cooler weather for a certain area, the server may determine and sent a signal to the controllers located in said area in order to take into account the changing weather conditions. The server may even calculate, taking into account the energy prices, such as night-rate, the cheapest time for pre-heating the entities in said area, and sent signal indicating the optimal time window to the appropriate controllers.

The energy tariff information is preferably used as an input for the control system in deciding whether to cool or heat the building with the cooling/heating equipments, or to ventilate the building to bring cool or heat into the building from the outside of the building. Thus it is possible to minimise the energy cost by using the information on costs of different types of energy and using the currently least expensive energy source.

The server may be adapted to allow web-based system set-up and management, as well as to control logging of events so that all events are logged e.g. in the server SQL database and are accessible to queries e.g. from authorized outside applications (management tools). In addition the controller controlling and monitoring modules' status may send data to the server, where data may be stored e.g. an SQL database, as well as also processed and analysed and taken into account when determining control signals to the controllers. Furthermore the server may be used to manage configurations and updating the controllers' logic and/or software.

Figure 2:
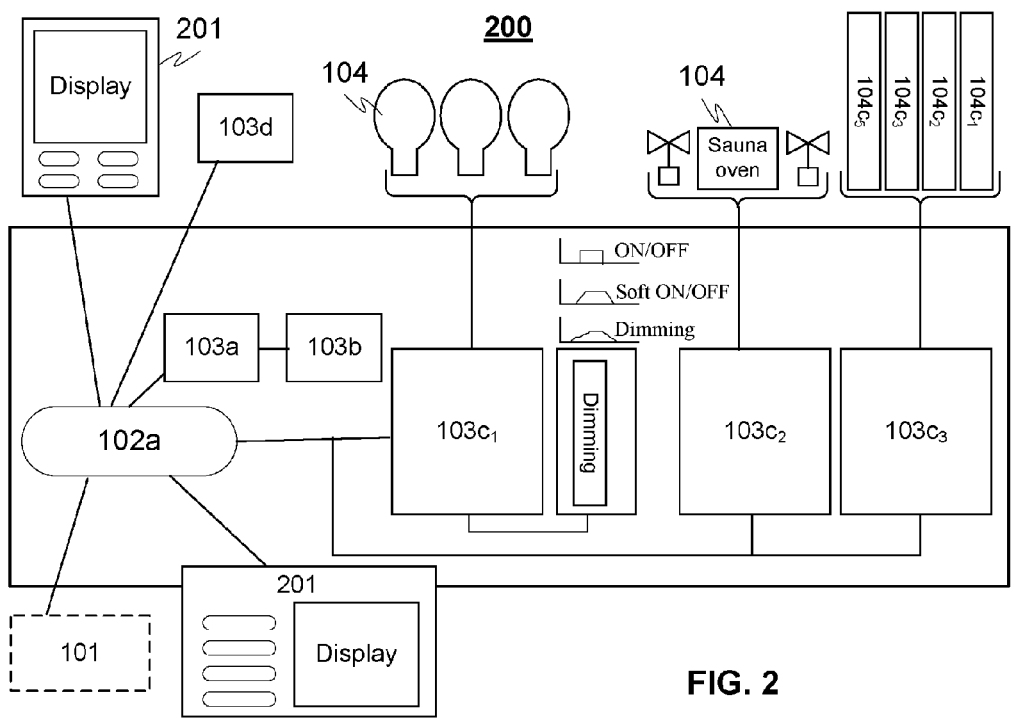
FIG. 2 illustrates an exemplary apartment, where the system is used for controlling the environmental conditions according to an embodiment of the invention.

As it can be noticed from the FIG. 1 the system advantageously comprises plurality of controllers 102a, 102b, 102c, which each is responsible advantageously of one entity, such as an apartment described in the connection with FIG. 2. According to the present invention minimizing the energy consumption and costs e.g. for larger or more complex entities can be achieved, when the controllers 102a, 102b, 102c of the different entities are in data connection with each other and where at least one environmental condition of the first entity somehow depends on at least one environmental condition of the second entity.

For example the user living at the first entity (like home) may work at the second entity (like workplace), whereupon the environmental conditions of the first and second entities may be adapted to affect with each other. For example when the user is at home the home may be switched into the occupied mode by the controller 102a (controller which is responsible of the environmental conditions of home) and the user's workplace into the economic mode by the controller 102b (controller which is responsible of the environmental conditions of the workplace) at the same time, because the user is at home and not at work. This means that for example the temperature and ventilation will be adjusted at home in comfortable level (e.g. determined by the user beforehand as he wishes) and at the same time at work into the economic mode.

In addition it should be noticed that the system of the invention may control the equipments of the entities softly so for example when the user is leaving his workplace, the equipments and/or sensors detecting the identified presence of the user at his workplace may sent a signal to the controller 102b of the workplace to indicate that the user is leaving. The workplace's controller 102b may in its part sent a signal indicating the leaving to the controller 102a at the user's home, whereupon the controller 102a at the user's home may control the function of equipments 104 at home via modules in order to achieve comfortable environmental conditions when the user arrives.

Overall it can be noticed that at least one parameter used for controlling the environmental condition of the first entity depends on at least one measured environmental condition parameter of the second entity being different that said first entity.

In addition the system may utilise e.g. self-learning algorithms, such as learning how much time it typically takes for the user to arrive after leaving workplace, so that the system can anticipate and optimize the optimal rate for changing the environmental conditions, such as heating rate from 18° C. to 22° C. Furthermore the system may utilize neural network and self-learning algorithms, such as learning inertia of the entity relating e.g. to cooling or heating so e.g. how much time it takes typically to warm the environment from 18° C. to 22° C. In addition the system may also take into account the possible rush hour so that it can delay the heating process respectively, for example, as well as changing weather conditions forecast.

It should be noted that the learning may be continuous learning, where the system updates its learning every time when the environment condition must be changed, for example taking into account also the current weather (wind, sunny, humidity and outdoor temperature, for example) when changing the entity's temperature and/or humidity, for example. Thus the system can later take into account for example that for example when the indoor temperature must be changed from 18° C. to 22° C. it takes e.g. 22 min longer, if the outdoor temperature is −15° and it is winding than if the outdoor temperature is +15° and it is sunny.

FIG. 2 illustrates an exemplary single apartment 200, where the system, such as the system 100, is used for controlling the environmental conditions according to an embodiment of the invention. The hierarchy of the components, such as controllers 102 (i.e. controlling means), modules 103 and equipments 104, as well as also a server 101 (if used), is advantageously similar as described in connection with the FIG. 1.

Even though it is not described in FIG. 1, the system 100 advantageously comprises also a user interface means, such as a control panel 201 being in a data connection with the controller responsible of controlling the environmental conditions of said entity 200. The user interface means 201 is used e.g. for inputting control parameters for desired environmental conditions, but it can be used also for informing the user e.g. about the current environmental conditions of the entity, energy consumption and maintenance costs, as well as displaying information transferred from the outside of the entity 200, such as for example weather forecast information or outside environmental information sent by the server in the embodiment, where the server is in use. Also some of the information sent by the other controllers managing the other entities may be displayed, such as e.g. information about possible fire in the neighbourhood or environmental conditions of the user's workplace. In addition the user interface means 201 may comprise also at least one sensor for determining environmental conditions, such as temperature and other parameters discussed elsewhere in this document.

The user interface means 201 can be implemented e.g. by a touch screen. It should be noted that there may be numbers of user interface means 201 in the same entity, such as one on the first floor and the other on the second floor. According to an embodiment an LCD keypad may be installed e.g. in the garage instead of a costly touch screen. In addition an infrared module 103d (or other module able to a wireless communicating) may also be installed nearby the garage, so that the user may control for example the function of garage door by the remote controller. It should be noticed that also information from these user interface means can be used for example for controlling the environmental condition inside the apartment 200, such as for example when the user is arrived in the garage, the lighting and air ventilation may be switched into the occupied mode.

It should be noticed that the user interface means may be web-based and accessible from a computer or hand-held device, like devices connected to LAN or to the Internet. The user interface means may also be used for real time system monitoring and controlling e.g. via the touch screen, computer or hand-held device, such as smart phone, as well as overall managements, such as managing users/access control rules, viewing logs, work time and security areas status, arming/disarming etc.

The system 100 may be used at the entity 200 for controlling the same exemplary environmental conditions as described elsewhere in this document. The controller 102a is used at the entity 200 for example controlling access and security means via the access control module 103a and security module 103b, respectively. In addition the controller 102a communicates with the I/O module $103c_1$ to control lighting conditions (illuminators and lamps $104c_4$, for example), and the I/O module $103c_2$ to control the heating of a sauna (oven, heat collector, taps, water valves in the sauna), as well as the I/O module $103c_3$ to control air condition, such as a heating means $104c_1$, cooling means $104c_2$, ventilation means $104c_3$, and/or means for affecting humidity $104c_5$.

Next few environmental conditions controlling examples are handled in connection with the apartment 200. Typically an entity's climate is mostly controlled by heating, cooling and ventilation. Those systems (according to prior art solutions) are generally "unaware" of each other's activities. For example, the heating system may be functioning at the same time the air conditioner is cooling. In addition, a constant flow of sufficient fresh air in the building is maintained according to a pre-controlled volume, not on the basis of air quality or the people present. All this requires an unreasonable amount of money and natural resources.

One object of the present invention is to make it possible to ensure that for example heating and cooling are not operating simultaneously in the same room, and that the entity's ventilation process is carried out according to the quality of the air or according to the people present in the room. This can be achieved for example by collecting information by either separate sensors or sensors integrated with control panels or modules relating to indoor and outdoor temperature and those of air quality, as well as by the access control and security systems. Also inertia of a building when cooling, as well as when heating is considered, and if applicable, indicators such as whether it is a sunny or a cloudy day and a 4-day forecast are also added.

According to an embodiment of the invention also a neural network technology may be utilized for example in a self-learning climate or other environment condition regulation. The self-learning capability automatically adjusts the climate control system to each room's energy characteristics, i.e. an installer doesn't have to consider the building's construction parameters (such as heating inertia etc.) and calculate the appropriate static control characteristics. These functions are built advantageously into the system 100 and are for example controlled by a computer program product run at/by the controller or server being in data communication with the modules. This has clear advantages and rapidly reduces the system adjustment time and makes maximum energy savings and constant automatic tuning of the climate control algorithm possible.

Furthermore additional energy savings are achieved by room-based ventilation control according to the invention. Ordinarily savings on energy are achieved by time-based automation (date and time), but the present invention provides an additional saving method, such as a identified or general presence-based climate control. Therefore if there's no one in a room, the system automatically decreases the heat setting and resets ventilation at the minimum level. Whenever a user enters the room, the normal climate control settings are restored. Also neural network and self-learning algorithms can be used for predicting e.g. when the user is arriving in the entity so that the equipments for controlling the environmental conditions can be switched for suitable mode and power at an appropriate moment and that the environmental condition, such as temperature, will be comfort at the time when the user arrives.

Also lighting control of the apartment 200 is one of the environmental conditions controlled easily by the present invention. Even though intelligent controlling of indoor and outdoor lighting is not very common these days, at the same time, lighting comprises a large share of electric bills and wastes natural resources. The present invention is also able to ensure control over the indoor and outdoor lighting. Lighting can be controlled according to the security of the building as well as by people's movement. For example, when the security system is switched off in the dark, sufficient lighting will be automatically switched on, as well as office rooms are lighted in accordance with the people arriving in rooms. The system 100 may also be adapted to switch off the lighting when people leave the rooms. Relevant information is obtained from the equipments and measuring devices read by the modules and controllers, such as from the access control or alarm systems, motion detectors and/or $CO_2$ level detector, for example. It is also possible to use self learning neural network for controlling lighting, whereby the system may learn which amount of light is required inside the building in e.g. different levels of light outside the building.

Thus the system may be adapted to control a building's lighting according to the people presence (general or identified), date and time, and also inside and outside illuminance conditions, room by room, whereupon it is possible to achieve up to 44% energy savings on lighting by combining only these three control methods. It should be noted that the presence-based lighting control offers savings, but also comfort simultaneously. Forgotten lights can be totally/partly switched off or the power can be reduced to increase savings if there has been no movement in a room for a certain time. Identified movements and automatically switched on lights make living more comfortable. Especially, if identified presence information is used it is possible to control the environment according to the personal preferences of each person. It's important to note that no special additional motion detectors are needed, because the system may use the same motion detectors used for security purposes. In general, it is preferable to use the information of certain sensors/measurement devices for both environmental control and security purposes.

In more details the date- and time-based lighting control makes it possible to switch all lights on and off at a certain time and, as a result, avoid wasting energy. Illuminance-based lighting control offers in its part the opportunity during the day to switch off lights which are pointless because there's enough illuminance coming through the windows. The illuminance conditions can be taken into account for example by measuring with appropriate sensors.

The system 100 may also comprise a dimming module, which can be utilized for example in controlling the lighting and ventilation, whereupon the functioning of the corresponding equipments can be implemented smoothly. In other words for example turning the lights ON or OFF can be done slowly, as well as also the power of ventilation, heating, cooling and/or humidifying may also be controlled to happen slowly or to be something between 0-100% of the maximum power. This ensures both the energy savings as well as also comfortability simultaneously.

The system 100 of the invention may also manage an alarm system of the apartment 200 e.g. by providing alarm and identified presence information to security companies, customers and other appropriate parts, such as lighting and climate control. According to an embodiment of the invention there's no need to integrate the system 100 into a separate alarm system, but all connections e.g. to lighting and climate control are handled by the software run at/by the controller or server (if used). The configuration of the function can be done simples just by defining rules. The system 100 may make an alarm to an appropriate party for example if there is a burglar, fire, panic or tampering or forced opening in the entity, or if some climate conditions indicating value (such as temperature, humidity, $CO_2$ level) exceeds the allowed range.

Furthermore the system 100 of the invention may also manage an access control of the apartment 200 e.g. by providing identified presence and location information for registering people's movements and using said information for controlling e.g. lighting and climate.

In addition the system 100 may allow a remote reading function, where different meters can be read to identify e.g. consumptions in the apartment or building and discover possible wasteful behaviour.

Also an intercom means can be incorporated into the system 100 used in the apartment 200. An audio/video intercom function may be combined e.g. with a VoIP (Voice over IP) technology-based voice system and a surveillance camera-based video system. The controller 102a or server (if used) comprises a VoIP gateway so that video pictures from the (video) security system and voice signals from outside are combined and shown on the user interface means, such as via a touch screen and on a web browser. According to an exemplary scenario of the invention a guest may dial the phone number of the apartment/house, whereupon the controller 102a receives a signal, switches the touch screen picture to a preconfigured surveillance camera and plays a doorbell melody on a loudspeaker. The user may answer the call, cancel the call or let the guest in at once without answering the call. Video messages may be available for leaving messages if people are not home.

Figure 3:
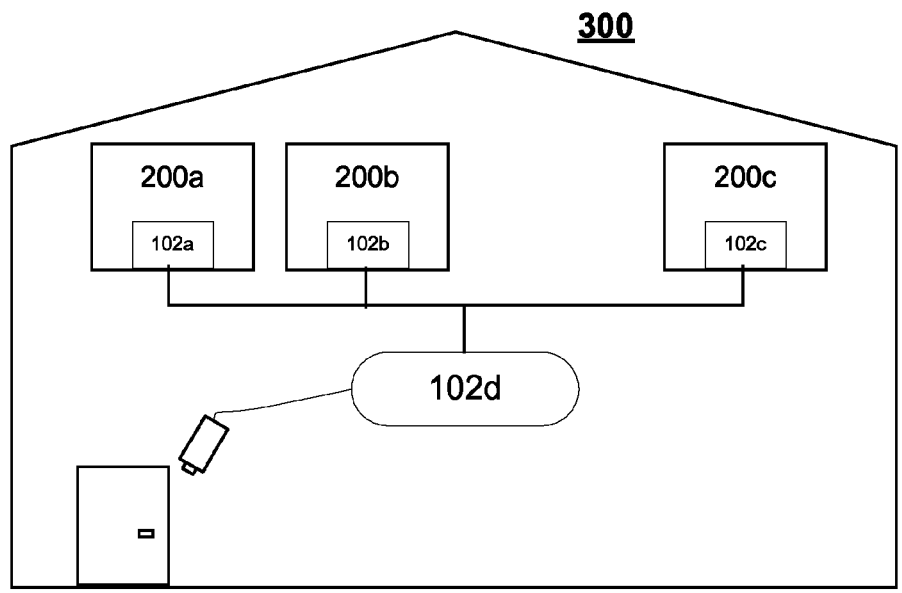
FIG. 3 illustrates an exemplary building comprising plurality of apartments, where the system is used for controlling the environmental conditions according to an embodiment of the invention.

FIG. 3 illustrates an exemplary building 300 comprising plurality of entities, such as apartments 200a, 200b, 200c, where the system 100 is used for controlling the environmental conditions according to an embodiment of the invention. In addition the system 100 incorporated into the building 300 comprising plurality of apartments 200a, 200b, 200c may comprise a controller 102d, which is adapted to control the overall environmental conditions of the building, such as e.g. of the public or common areas of the building, like staircase lighting or ventilation. Also the intercom means 301 may be integrated into the system 100 used in the building 300, as already described in connection with the FIG. 2.

According to an embodiment of the invention the controllers 102a, 102b, 102c of the apartments 200a, 200b, 200c are adapted to communicate with each other and to take into account also appropriate information from the next controllers when controlling or adjusting the environmental conditions of the apartment it is responsible for. For example if there is a fire in the apartment 200a, the fire sensing equipment will sent a fire signal to the controller 102a of the apartment 200a, whereupon the controller 102a will sent for example an alarm to the fire station, a control signal to the sprinkler system of the apartment 200a, and a control signal to ventilation means to close ventilation, but also a fire signal at least to the controllers 102b, 102c of the nearest apartments, and/or the server, if the server is used.

Thus when receiving the fire signal the controllers 102b, 102c may also be adapted to sent a control signals to different modules related to the corresponding apartments 200b, 200c, such as to close the ventilation and switch off the electricity, but maybe also to send message to the users of apartments 200b, 200c.

The system may also take into account other environmental features in the neighbourhood, such as for example longer holidays, whereupon e.g. the to temperature in the first apartment 200a being in the economic mode for a longer period (e.g. because of holiday) may be adjusted quite low compared e.g. to the nearest apartment 200b being in the occupied mode. There the controller 102a of the first entity may send a signal to the second entity's controller 102b about the period and the lower temperature, whereupon the second entity's controller 102b may take this into account when e.g. changing temperature. The self-learning algorithm may for example learn, how the lower temperature in the nearest entity effect for the heating or cooling characteristic of the second entity due to e.g. heat transfer through the inner walls separating the first and second entities.

Again it can be noticed that at least one parameter used for controlling the environmental condition of the first entity depends on at least one measured environmental condition parameter of the second entity being different that said first entity.

Figure 4:
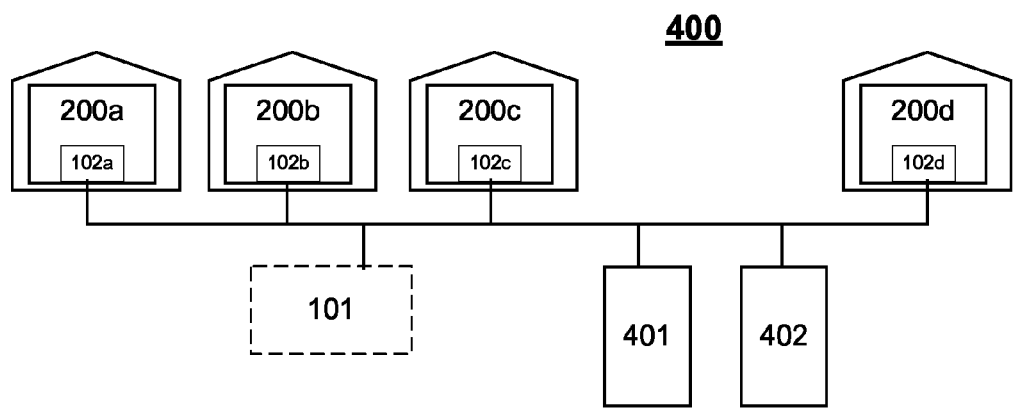
FIG. 4 illustrates an exemplary arrangement, where the system is used for controlling the environmental conditions of plurality of different entities comprehensively according to an embodiment of the invention.

FIG. 4 illustrates an exemplary arrangement 400, where the system 100 is used for controlling the environmental conditions of plurality of different entities comprehensively according to an embodiment of the invention. When the entities (apartments) were in FIG. 3 essentially in the same building, the FIG. 4 represents the arrangement where the entities may be physically separated, such as a workplace and home of a certain user. In principle there is no limit for the distance between the different entities which environmental conditions there are controlled by the present invention.

According to an advantageous embodiment of the present invention the controllers 102 related to different entities are adapted to transfer e.g. measuring information with each other either directly or via a server 101. In addition the controllers 102 are adapted to take into account also the information gathered from the other controllers when adjusting or controlling the environmental conditions of its entity e.g. in a similar manner as described in connection with figures above. For example if the controller 102a of the first entity, such as an apartment, detect a fire in the first entity, it may sent a message at least to the controllers 102b, 102c of the next entities, whereupon the controllers 102b, 102c may take the fire message into account when adjusting for example a ventilation. If for example the controller's 102b entity is non-occupied and the ventilation is in OFF mode, the fire message may not cause any further action. However, if for example the controller's 102c entity is occupied (there are people inside) and the ventilation is in ON mode, the fire message may cause the controller to output the signal to the I/O module to switch ventilation in OFF mode and possibly to output a warning signal to the user in the building informing about the fire situation. Warning signal may be for example an audio signal, such as an announcement, and/or warning text on user interface.

Furthermore the controllers 102 may be provided with the identified presence information of the users in certain entities. For example the first controller 102a may locate at home and determining presence information about certain people via the modules and equipments, such as a PIN code reader related to the alarm system. The second controller 102d may locate at the user's workplace 200d being adapted to receive or gather the presence information of the user at his home and thus determine when said user leaves his home or workplace, as discussed earlier in this document. In addition the second controller 102b may be adapted to output a control signal to the modules, such as to the I/O module to switch ventilation and/or heater/cooler means into the comfortable state, when the controller 102b is provided with the information that the user is leaving his home and/or arriving in the workplace.

In addition the FIG. 4 represents few additional means co-operating with the system 100, such as a traffic information service 401 and weather forecast service 402, which may send traffic and weather forecast information to the controllers 102 or the server 101 being in data communication with the controller (if the server is used). Thus the system may also take into account the possible rush hour, traffic jam and/or changing weather conditions when adjusting and controlling the environmental conditions in each entity, such as delays in arriving, whereupon the controller may send a controlling signal to modules and again to equipments to delay.

Furthermore it should be noted that the functioning of the controlling means, i.e. the method steps of the invention described above can be implemented at least partly by a suitable computer program product, when said computer program product is run on a computer or the like, such as the controlling means or the server described in this document.

It is to be noted that the traffic information service and weather forecast service are only examples and many other additional parties and services generating useful information in view of the environmental condition controlling may be used and added into the system as the skilled person will realize.

Again it should be noted that a neural network technique as well as self-learning algorithms can be used according to an embodiment for controlling functions of a building, using prediction of conditions in the building and self learning, such as using general or identified presence information for controlling functions in entities or other premises such as roads. However, other possible prediction/estimation methods may naturally be alternatively used.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A controlling system for adjusting environmental conditions of at least first and second entities, characterized in that, each of the entities has desired environmental conditions for at least two different states, and that the system comprises
   a) first equipments for adjusting the environmental condition of said first entity, and second equipments for adjusting the environmental condition of said second entity, where the adjusting is based on controlling parameters,
   b) first controlling means for controlling the function of said first equipments, and second controlling means for controlling the function of said second equipments, c) first measuring means for measuring environmental condition in said first entity and signalling it to the first controlling means, and second measuring means for measuring environmental condition in said second entity and signalling it to the second controlling means, and wherein d) said first and second controlling means are adapted to provide said controlling parameters to said first and second equipments so that at least one parameter used for controlling the environmental condition of the first entity depends on at least one measured environmental condition parameter of the second entity, and that at least one parameter used for controlling the environmental condition of the second entity depends on at least one measured environmental condition parameter of the first entity, where said first entity is different that said second entity, wherein said first and second controlling means are provided with general or identified presence information of the user in at least one entity and/or predicted location information of the user indicating when the user will leave or arrive in the first and/or second entity.

2. A controlling system of claim 1, wherein the controlling means is adapted to signalling the equipment of its entity to go into the occupied or non-occupied state based on said presence information and/or predicted location information.

3. A controlling system of claim 1, wherein said predicted location information of the user is generated using a neural network, self-learning algorithms and/or traffic information gathered from the environment between the entities the user moves.

4. A controlling system of claim 1, wherein a self-learning neural algorithm is used for providing said controller with said predicted location information of the user, and/or wherein said self-learning neural algorithm is used for providing the controlling means with at least one of the following inputs:
  a) heating inertia information about the entities determined by said neural algorithm,
  b) current outdoor weather conditions,
  c) weather forecast information, and/or
  d) tariff of energy costs for changing the environmental conditions of the building.

5. A controlling system of claim 1, wherein said self-learning neural algorithm is adapted to take into account at least one of the following:
  a) current and desired indoor temperatures (of the entity in question and/or also of the other nearest) and possibly at least one of the inputs 5.a)-5.d) of claim 4 when it is adapted to determine the control parameter signal to said heating, cooling and/or ventilation means,
  b) current and desired indoor humidity and possibly at least one of the inputs 5.a)-5.d) of claim 4 when it is adapted to determine the control parameter signal to said means for affecting humidity and/or ventilation means,
  c) current and desired indoor $CO_2$-level and possibly at least one of the inputs 5.a)-5.d) of claim 4 when it is adapted to determine the control parameter signal to said ventilation means, and/or
  d) current and desired indoor/outdoor lighting and possibly at least one of the inputs 5.a)-5.d) of claim 4 when it is adapted to determine the control parameter signal to said lighting means.

6. A controlling system of claim 1, wherein the controlling parameters provided by said controlling means is based also on the measured environmental condition and said desired environmental condition for said entity, which environmental condition is to be adjusted, in order to achieve or maintain said desired environmental condition for the desired state of said entity.

7. A controlling means for adjusting environmental conditions of at least one entity, wherein the entity has desired environmental conditions for at least two different states, characterized in that,
  the controlling means is adapted to provide controlling parameters to equipments for adjusting the environmental condition of said entity so that at least one parameter used for controlling the environmental condition of said entity depends on at least one measured environmental condition parameter of another entity being different from the entity, which environmental condition is adjusted by said equipment, wherein the controlling means is provided with general or identified presence information of the user in at least one entity and/or predicted location information of the user indicating when the user will left or arrive in the entity which environmental condition is to be adjusted, whereupon the controlling means is adapted to signalling the equipment of its entity to go into the occupied or non-occupied state based on said presence information and/or predicted location information.

8. A method of claim 1, wherein said first and second controlling means are provided with general or identified presence information of the user in at least one entity and/or predicted location information of the user indicating when the user will left or arrive in the first and/or second entity.

9. A method of claim 8, wherein the controlling means signals the equipment of its entity to go into the occupied or non-occupied state based on said presence information and/or predicted location information.

10. A method of claim 8, wherein said predicted location information of the user is generated using a neural network, self-learning algorithms and/or traffic information gathered from the environment between the entities the user moves.

11. A method of claim 8, wherein a prediction, such as preferably self-learning neural algorithm, is used for providing said controller with predicted location information of the user, and/or wherein said prediction is used for providing the controlling means with at least one of the following inputs:
  a) heating inertia information about the entities determined by said neural algorithm,
  b) current outdoor weather conditions,
  c) weather forecast information, and/or
  d) tariff of energy costs for changing the environmental conditions of the building.

12. A method of claim 8, wherein said self-learning neural algorithm is adapted to take into account at least one of the following:
  a) current and desired indoor temperatures (of the entity in question and/or also of the other nearest) and possibly at least one of the inputs 5.a)-5.d) of claim 5 when it is adapted to determine the control parameter signal to said heating, cooling and/or ventilation means,
  b) current and desired indoor humidity and possibly at least one of the inputs 5.a)-5.d) of claim 5 when it is adapted to determine the control parameter signal to said means for affecting humidity and/or ventilation means,
  c) current and desired indoor $CO_2$-level and possibly at least one of the inputs 5.a)-5.d) of claim 5 when it is adapted to determine the control parameter signal to said ventilation means, and/or d) current and desired indoor/outdoor lighting and possibly at least one of the inputs 5.a)-5.d) of claim 5 when it is adapted to determine the control parameter signal to said lighting means.

13. A method of claim 8, wherein the control parameters are provided to the equipment with a certain delay and in a certain time window.

14. A method of claim 8, wherein the controlling parameters provided by said controlling means is based also on the measured environmental condition and said desired environmental condition for said entity, which environmental condition is to be adjusted, in order to achieve or maintain said desired environmental condition for the desired state of said entity.

15. A computer program product for adjusting environmental conditions of at least first and second entities, characterized in that, each of the entities has desired environmental conditions for at least two different states, and in that the computer program product is adapted to perform the steps of claim 8, when said computer program product is run on a computer.

\* \* \* \* \*